Sept. 22, 1964     J. E. SAUVAGE ET AL     3,149,370
ANIMAL SLAUGHTERING

Original Filed March 25, 1960     2 Sheets-Sheet 1

John E. Sauvage
Bryan S. Elliott
INVENTORS

BY

ATTORNEY

Sept. 22, 1964     J. E. SAUVAGE ET AL     3,149,370
ANIMAL SLAUGHTERING
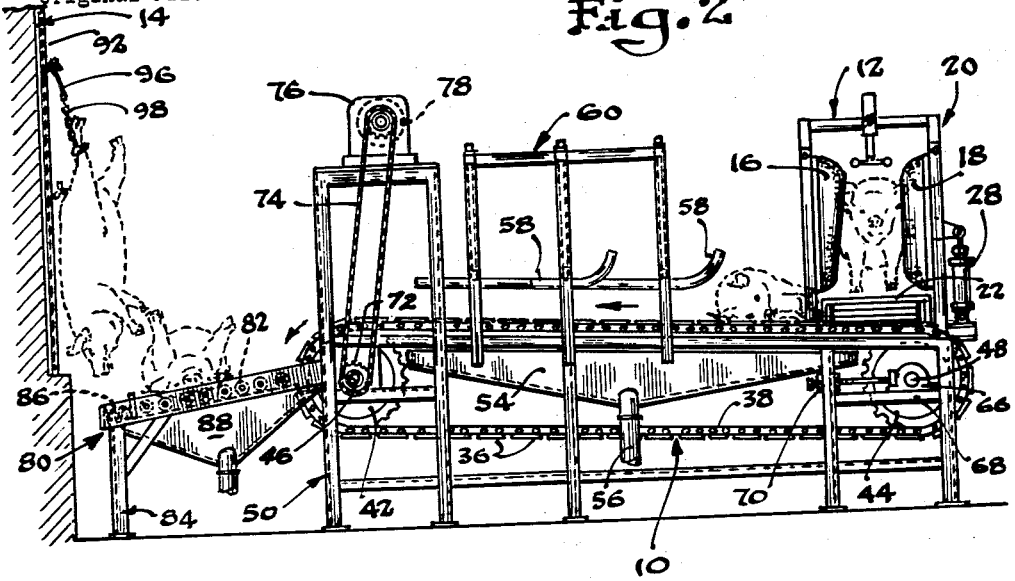
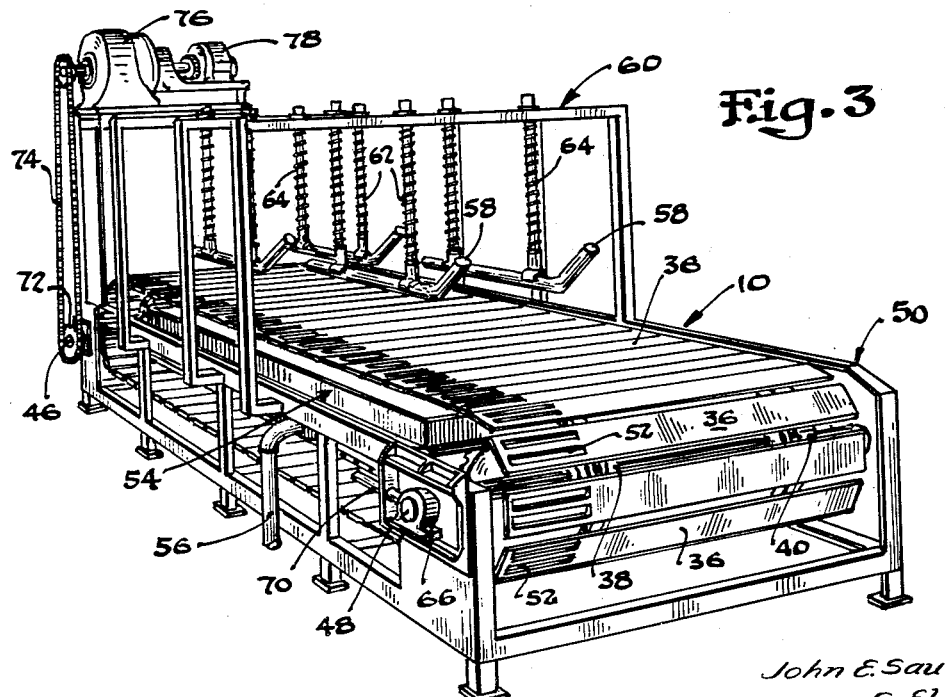
John E. Sauvage
Bryan S. Elliott
INVENTORS United States Patent Office 3,149,370
Patented Sept. 22, 1964

3,149,370
ANIMAL SLAUGHTERING
John E. Sauvage, Chicago, and Bryan S. Elliott, La Grange, Ill., assignors to Swift & Company, Chicago, Ill., a corporation of Illinois
Original application Mar. 25, 1960, Ser. No. 17,647. Divided and this application Oct. 3, 1962, Ser. No. 228,138
9 Claims. (Cl. 17—45)

This invention relates to a method for a slaughtering process; and more specifically relates to an improved method useful in the sticking and bleeding of meat animals.

The present application is a division of our copending parent application S.N. 17,647 filed March 25, 1960, for improvements in Animal Slaughtering.

Heretofore, hog slaughtering operations, for example, have involved the shackling of one hind foot of a conscious animal and hoisting it from the floor. When suspended by the hind foot, the animal was stuck, that is, arteries in the neck were severed by cutting the throat of the animal, and allowed to expire by bleeding to death in that attitude. With larger animals much the same procedure was followed, except for convenience the animals have usually been rendered unconscious before shackling and hoisting. Following bleeding, various other operations, such as scalding, dehairing, and removing the hide or skin, etc., are undertaken.

Another prior method, is described in the Nicholson et al. Patent No. 712,579 and recently improved in the Murphy Patent No. 2,895,164, involves the sticking and complete bleeding of an animal while resting bodily upon a horizontally moving conveyor. While this method has lately been gaining favor in the packing industry, it has certain economic disadvantages since the equipment required takes up a relatively large floor space, is costly, and is completely independent of older bleeding systems and thus, for many packers, makes useless existing hoisting and shackling apparatus. Also, many proponents of the old method maintain that more complete bleeding is obtained by suspending the animal head down during that period.

However, recent Federal legislation relating to humane slaughtering practices has caused the packing industry to search for new quick and efficient means to immobilize each animal by rendering it insensitive to pain, usually unconscious, before sticking and bleeding. To this end it has become highly desirable that the insensitive animal be moved mechanically and rapidly through those operations. This is especially so where the animal is rendered unconscious by electrical shock, since it has been found that sticking within a short period of time after shock will avoid excessive hemorrhaging of the animal, which usually accompanies electrical shock, and thereby facilitates inspection of the animal's organs for disease.

Accordingly, it is the primary object of this invention to provide a method for rapidly handling animals from the immobilizing operation through shackling and hoisting and particularly during the step of sticking.

A further object of this invention is to provide a method for dispatching animals by immobilizing, sticking, and then shackling and hoisting each animal for complete bleeding and expiration.

Another object of this invention is to provide a method for dispatching animals which is adaptable to advantageously use the present systems and equipment found in most packing houses.

An additional object of this invention is to provide a humane method for rapidly dispatching animals, wherein the final complete bleeding of each animal is accomplished in a vertically suspended attitude.

Briefly stated, the present invention contemplates the immobilization of an animal, preferably by electric shock, while physically restrained, and discharging the insensitive animal on to a substantially horizontally disposed conveyor, whereupon the animal is stuck and moved generally transversely to a shackling station. The stuck animal is then shackled by a hind foot and hoisted to hang vertically whereby bleeding is completed in the conventional manner. In carrying out this method, a new piece of apparatus is employed in combination with an animal restrainer and the shackle hoist. We have devised an endless conveyor comprising a plurality of slats slotted at one end with the upper run of the conveyor disposed generally horizontally between the discharge end of an animal restrainer and the loading end of a shackle hoist. The immobilized animal is discharged transversely upon the conveyor with its head and neck resting over the slots and is stuck in that position. A blood collecting trough may be located beneath the slots; and one or more hold down rails may be spaced above and in line with the conveyor. In most installations, a receiver platform is provided between the discharge end of the sticking conveyor and the hoist.

Further objects and advantages will become apparent upon reading the following detailed description in conjunction with the drawings wherein:

FIGURE 2 is an elevation view of the entire system taken from one side of the sticking conveyor; and FIGURE 3 is a perspective view of the sticking conveyor taken apart from the remainder of the system.

Figure 1:
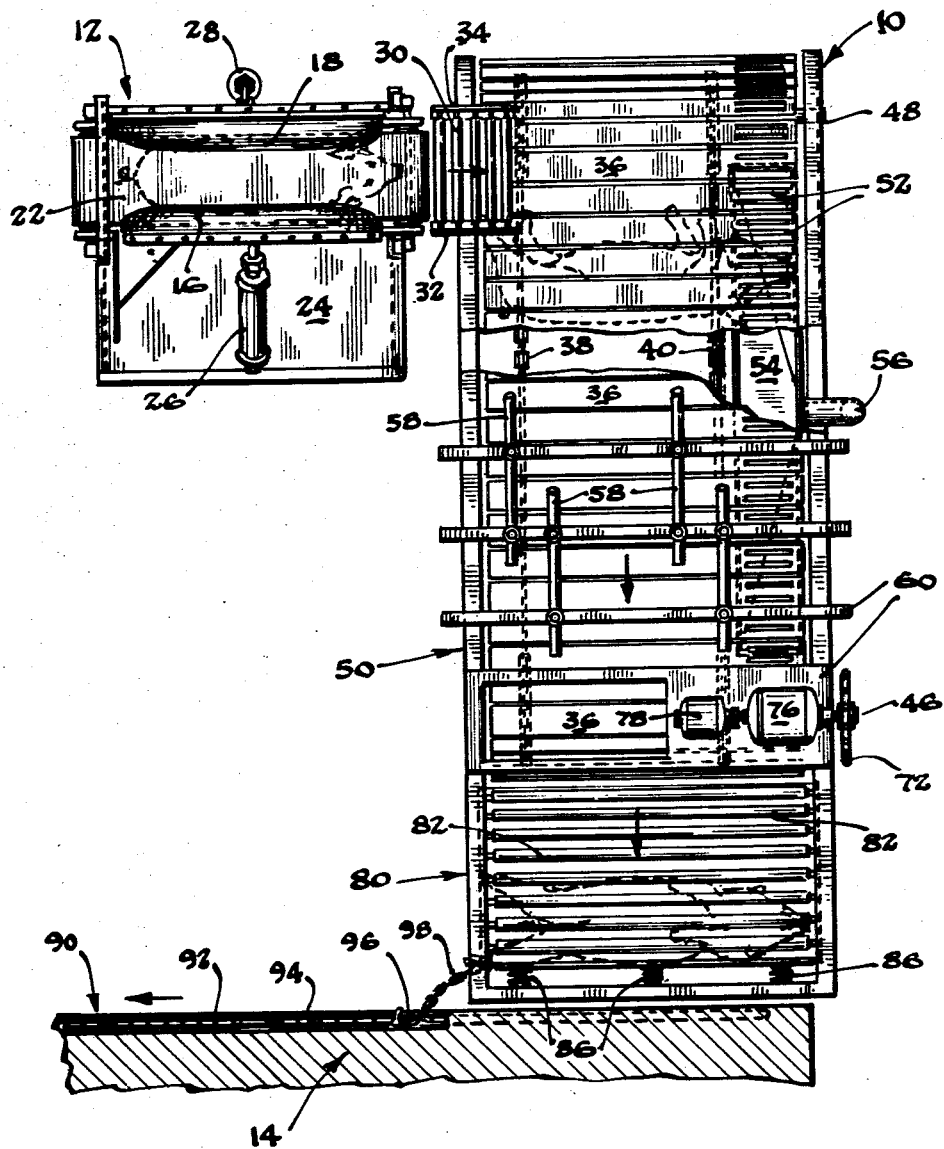
FIGURE 1 is a plan view of the complete system with certain parts broken away for clarity.

Referring to the figures wherein the same elements are denoted by like reference characters throughout, the details of both method and apparatus of the present invention will be described. A sticking conveyor generally 10 extends between the discharge end of a restrainer generally 12 and a shackle hoist generally 14. The restrainer 12 consists of a pair of engaging cushions 16, 18 mounted within a frame 20 above an endless belt 22 which is operable to advance an animal to a position therebetween. A platform 24 of metal grating or the like is provided to one side of the restrainer 12 wherefrom an operator can control the restrainer and immobilized animals engaged therein. The type of restrainer illustrated is described in greater detail in U.S. patent application S.N. 833,289 filed August 12, 1959, now Patent No. 3,051,984, the disclosure of which is incorporated herein by reference. However, other similar apparatus such as that shown in the Moss Patent No. 2,912,715 can also be employed.

In the apparatus illustrated in FIGURES 1 and 2 the cushions 16, 18 are operated by pneumatic cylinders 26, 28 respectively upon signal from the operator whereby cushion 16 pivots inwardly and cushion 18 moves upwardly to hold an animal slightly above the belt 22 and resting on one side. While the animal is so held the operator acts to render the animal insensitive, preferably unconscious, as by electric shock. This step can also be performed by striking the animal upon the head with a blunt instrument or by injecting a suitable drug into its body. However, we prefer to use electrical equipment such as that described in U.S. patent application Serial No. 833,288 filed August 12, 1959, now Patent No. 3,055,046 (issued September 25, 1962), which, when pressed against the forehead of the animal with force sufficient to insure good electrical contact, will automatically deliver a current to the animal for a period insuring unconsciousness.

Upon the animal becoming insensitive the cushions 16, 18 are released to drop it upon the belt 22 which moves the animal forward toward the sticking conveyor 10. When the apparatus of the aforementioned patent applications are employed the animal is released from the cushions automatically upon termination of the electric shock.

As may be seen in FIGURE 2, the restrainer 12 is conveniently located at a level slightly higher than the sticking conveyor 10. Accordingly, by placing a plurality of rollers 30 journaled between rails 32, 34 and inclined downwardly to the upper run of conveyor 10, each animal may be discharged by gravity to rest generally transversely of the conveyor 10 with its head disposed at the far side thereof.

The sticking conveyor 10 is so called because it is intended that an operator stick each animal in the throat as it rests thereon. This is most rapidly accomplished by an individual stationed alongside the conveyor generally opposite the restrainer where he can stick the animal immediately upon being discharged from the latter. As will later become clear, several immobile animals may be collected upon conveyor 10 after an operator performs the sticking operation and in this way two operators can run the entire system.

As best seen in FIGURE 3, the sticking conveyor 10 is comprised of a plurality of rectangular slats 36 secured to a pair of endless chains 38, 40. The chains 38, 40 are in turn trained about sprockets (sprockets 42, 44 as seen in FIGURE 2) which are secured to axles 46, 48 respectively. A frame generally 50 supports the assembly so that the upper run of slats 36 is substantially horizontal. However, the conveyor may be slightly inclined as shown in FIGURE 2 where it is necessary in tying in with existing equipment. Each slat 36 is spaced one-half inch on the chains 38, 40 and has a pair of slots 52 machined in the end disposed away from the restrainer 12 to permit blood from the throat of the stuck animals to drain to a collecting pan 54 secured to the frame 50 between the conveyor runs. The pan in turn is emptied through a pipe 56.

The sticking conveyor generally 10 is also provided with a plurality of longitudinally disposed hold down rails 58 depending from a superstructure generally 60 on telescoping members 62. The rails 58 are spaced above the upper run of slats 36 and are bent upwardly at the leading ends so that animals on the conveyor 10 will easily pass thereunder. The rails 58 prevent the shifting of animals on the conveyor during convulsions. Usually we find that the weight of the rails 58 and friction of the telescoping members 62 is sufficient to hold the animals; however, coil springs 64 may be provided about the latter biasing the rails downwardly. Where the conveyor 10 is relatively short, and depending to some extent on the method of immobilization employed, the hold down rails may be dispensed with entirely.

In FIGURE 2, it may be seen that the conveyor axle 48 is supported in a pillow bearing 66 (and another bearing at the opposite end, not seen). Each pillow bearing is slidably mounted upon a way 68 in frame 50. An adjustable tightener generally 70 is provided to properly tension the conveyor 10 through movement of the bearing 66 in the way 68. At the opposite discharge end of the conveyor the axle 46 is journaled in the frame and a drive sprocket 72 is fastened to an end thereof. A drive chain 74 connects the drive sprocket 72 with a gear reducer 76 and electric motor 78 located above the conveyor 10 on the superstructure. Obviously the power source for the conveyor 10 could be located elsewhere.

Preferably a receiver platform generally 80 is positioned at the discharge end of the sticking conveyor 10 to support the animals as they are being shackled. One type of platform has been illustrated comprising of a plurality of rollers 82 rotatably mounted on a subframe generally 84 extending from the sticking conveyor frame 50. Each roller 82 is approximately equal in length and parallel to slats 36.

Furthermore, it will be observed that the system of rollers is inclined downward from a line approximately at the level of axle 46 to a spring mounted stop 86, whereby animals are relatively gently passed from the slats 36 to rollers 82 and come to rest at the stop 86 where each is shackled and hoisted. The receiver platform 80 is also provided with a blood pan 88 and drain.

At this point it should be apparent that the immobilized animals, discharged from the restrainer 12 onto the conveyor 10, are stuck and conveyed to the receiver platform 80 from which they are shackled and hoisted for complete bleeding. However, of necessity some bleeding will occur on the sticking conveyor and platform. We have found that by employing three separate operators for the immobilizing, sticking, and shackling steps respectively, the highest production rate can be achieved with a relatively short sticking conveyor. Where three operators are employed the conveyor may also be operated at a comparatively fast speed with the desirable result that each animal spends a minimum amount of time lying prone and proportionately greater bleeding is accomplished in the vertical position.

To this end, our preferred method involves rendering unconscious each animal by electrically stunning it when within the restrainer 12, whence it is discharged upon the conveyor 10 and stuck within about 4½ seconds after the electric current is terminated. The animal is then immediately transported transversely with respect to its position on the conveyor and shackled for hoisting within a total elapsed time of about 15 seconds from stunning. Thereafter the animal is quickly hoisted and bleeding is completed in the conventional manner. In this regard it is recommended that the animal be immobilized to a degree insuring unconsciousness for about 45 seconds which will be more than sufficient to allow bleeding to progress to a point that death will occur without the animal ever becoming conscious.

However, where the packing house operates at reduced capacity or does not attempt large volume slaughter, it is possible for two operators to perform all of the above functions. When this is desired, the sticking conveyor 10 is run discontinuously by one of the operators and the animals processed in groups of two, three, four or more. In the essentially batch method, one operator can perform the immobilizing and shackling operation and a second operator stick the animal; or the sticker can also perform the shackling operation, leaving the first operator free to herd additional animals toward the restrainer. Obviously the number of operators required will depend upon both the rate of animals processed and the physical layout of the system. The latter factor often dictates the most likely combination of functions in the batch type operation for one of the operators. Furthermore, both of these factors will also influence the optimum length of the sticking conveyor 10 and the speed at which it operates.

The shackle and hoist equipment is of conventional design, and apart from the combination with our sticking conveyor forms no part of the present invention. Preferably we use an inclined type hoist feeding into an ordinary overhead bleeding rail system, generally 90. The hoist includes an inclined track 92 supporting an endless chain 94, which bears a series of spaced hooks 96. The lower end of the track 92 is disposed adjacent to the receiver platform 80 and runs upwardly to a point adjacent to bleeding rail 90. A separate electric motor, not shown, powers the endless chain 94 continuously. In operation, an operator follows the usual practice of securing a short length chain 98 about one hind leg of the animal and places the free end over a hook 96. As the animal is hoisted, the platform 80 will be cleared for the next stuck animal to be discharged from the sticking conveyor 10.

Obviously many modifications and variations of the invention as hereinbefore set forth may be made without departing from the spirit and scope thereof, and therefore only such limitations should be imposed as are indicated in the appended claims.

We claim:

1. In a method for slaughtering an animal the improvement comprising the steps of: immobilizing the animal; depositing the immobilized animal in a horizontal posture at a given location; transporting the immobilized animal in a direction generally transverse to the body of said animal toward a given point spaced therefrom while said animal remains in said posture; sticking the animal at a station between said location and said point; thereafter shackling a hind foot of said animal; and then immediately lifting the animal by the shackled hind foot upon reaching said point to a vertical posture with its head hanging downwardly whereby the animal will bleed.

2. The method according to claim 1 in which the animal is immobilized by being rendered insensitive.

3. The method according to claim 1 in which the animal is immobilized by being rendered unconscious.

4. The method according to claim 1 wherein the animal is immobilized and rendered unconscious by an electric shock.

5. The method according to claim 1 in which the animal is immobilized by being rendered insensitive and then lifted within about 15 seconds after being rendered insensitive.

6. The method according to claim 1 in which the animal is immobilized by being rendered sufficiently unconscious to prevent regaining of consciousness within about 45 seconds.

7. In a method for slaughtering an animal the improvement comprising the steps of: restraining the animal from physical movement; applying an electrical charge to said restrained animal sufficient to cause unconsciousness in said animal; releasing said unconscious animal from restraint and depositing same free of any restraint at a given location in a horizontal posture; conveying the completely unrestrained and unconscious animal in a direction generally transverse to its body from said given location toward a point spaced therefrom, said animal being transported while in said horizontal posture; sticking said animal while in said posture within about 4½ seconds after the application of said electric charge; thereafter shackling and hoisting said stuck and unconscious animal upon reaching said point whereby the animal is lifted from the horizontal posture to a vertical attitude hanging head downwardly; and completing the major portion of the bleeding of said animal while hanging head downwardly.

8. The method according to claim 7 in which an animal is shackled and hoisted within about 15 seconds after the application of said electric charge.

9. The method according to claim 7 in which the electrical charge and bleeding is sufficient to prevent the animal from regaining consciousness within 45 seconds after the charge is applied.

References Cited in the file of this patent

UNITED STATES PATENTS

| | | |
|---|---|---|
| 2,841,817 | Murphy | July 8, 1958 |
| 3,031,716 | Hughes | May 1, 1962 |
| 3,055,046 | Hlavacek et al. | Sept. 25, 1962 |